United States Patent [19]
Dahmen et al.

[11] 3,761,577
[45] Sept. 25, 1973

[54] SECONDARY COMBUSTION PROCESS AND APPARATUS FOR THE MANUFACTURE OF CARBON BLACK

[75] Inventors: Karel R. Dahmen, Houston; William B. Crull, Dumas, both of Tex.

[73] Assignee: Continental Carbon Company, Houston, Tex.

[22] Filed: July 6, 1971

[21] Appl. No.: 159,606

[52] U.S. Cl. .................. 423/450, 23/259.5, 423/455
[51] Int. Cl. ............................................... C09c 1/50
[58] Field of Search ..................... 23/209.4, 209.6, 23/259.5, 277

[56]       References Cited
           UNITED STATES PATENTS

| 2,375,795 | 5/1945 | Krejci | 23/209.8 |
| 2,976,127 | 3/1961 | Latham | 23/259.5 |
| 3,235,334 | 2/1966 | Helmers | 23/209.4 |
| 3,362,789 | 1/1968 | Hardy et al. | 23/209.4 |
| 3,523,759 | 8/1970 | Kidd | 23/259.5 |
| 3,607,065 | 9/1971 | Forseth et al. | 23/209.4 |

*Primary Examiner*—Edward J. Meros
*Attorney*—Jerry B. Peterson

[57]                ABSTRACT

Relatively large particle-size, low structure carbon black is manufactured by applying primary heat in conventional fashion to a hydrocarbon oil feedstock and then applying secondary heat in the form of hot combustion gases introduced into the reactor downstream of the primary reaction zone. The flow of these secondary combustion gases is longitudinal with respect to the axis of the reactor and is introduced into the reactor in a plurality of streams directed in downstream flow in close proximity with the outer periphery of the secondary reaction zone. The reactor is of enlarged diameter just downstream of the point of introduction of the secondary combustion gases in order that the concentration and linear downstream velocity of the combustion products is essentially unaltered.

24 Claims, 4 Drawing Figures

KAREL R. DAHMEN
WILLIAM B. CRULL
INVENTORS

BY Jerry B. Peterson
ATTORNEY

3,761,577

SECONDARY COMBUSTION PROCESS AND APPARATUS FOR THE MANUFACTURE OF CARBON BLACK

BACKGROUND OF THE INVENTION

1. Field of the Invention

This invention relates to the production of oil furnace carbon black by the injection of suitable hydrocarbon oil feedstock into a heated reaction zone. More particularly, the invention relates to an improved apparatus and process whereby heat is introduced, not only into the upstream end of the reactor in conventional fashion in order to establish a primary reaction zone, but also into the reactor at a point downstream of the primary reaction zone, in order to establish a secondary reaction zone. Still more particularly, the invention relates to the manufacture of relatively low structure, large particle size carcass grades of carbon black involving the use of primary heat followed by secondary heat introduced into the reactor at a point downstream of the point of introduction of the primary heat in the form of hot combustion gases flowing into an enlarged secondary reaction zone in a substantially longitudinal downstream direction along the outer periphery of the secondary reaction zone.

Carbon blacks are produced by several processes; namely, the channel, furnace combustion, furnace thermal, and oil furnace processes.

The channel blacks are produced by impingement of small natural gas flames on the surface of metal collection elements. Channel blacks have been substantially relegated to specialty uses and ink manufacture by the other blacks produced by later developed processes, and manufacture of channel blacks is not considered or included in the scope of the present invention.

The furnace thermal process produces the coarsest carbon blacks that are generally used in applications requiring a high carbon black loading and a minimal reinforcing of the rubber. Thermal blacks have, in addition to large particle size, almost complete absence of structure. The thermal blacks are conventionally produced by the thermal decomposition of gaseous feedstock by intermittent operation of an insulated furnace utilizing heating and production cycles.

The furnace combustion process produces carbon blacks that are generally used for reinforcement of rubber used as tire carcass stocks in which low heat generation is important. These blacks are generally referred to as the gas furnace blacks and are produced by the thermal decomposition of a portion of a feedstock, with the remainder of the feedstock being combusted under oxygen deficient conditions to provide the necessary heat for the carbon forming reaction. Basically the feedstock for furnace combustion blacks is natural gas; however, the practice of enriching the feedstock by injecting liquid hydrocarbon is becoming more prevalent as the natural gas fields become depleted.

The oil furnace process produces the carbon blacks that are used more than all others by the manufacturers of rubber for tires and related applications. These rubber reinforcing blacks are produced by the thermal decomposition or cracking of hydrocarbon feedstocks that are at least partially liquid at normal ambient conditions and have a substantial aromatic hydrocarbon content. The feedstock is introduced into an enclosed furnace to be contacted with the heat of decomposition generated by the separate combustion of a mixture of fuel and air to form the carbon black from the oil feedstock. The combined stream of carbon black suspended in combustion gases is quenched with water at the appropriate point in the reaction to reduce the temperature sufficiently to terminate the carbon black forming reaction.

The combustion gas stream containing suspended particles of carbon black is subjected to a series of steps to separate the carbon black from the gas and provide for the collection of the carbon black for additional processing. This invention is concerned only with the reactor and reaction process by which the carbon black is created, so this disclosure is limited to the furnace reactor or production portion of the manufacturing process.

Oil furnace carbon black reactors are generally of cylindrical elongate configuration and are usually but not always disposed horizontally. The reactor conventionally consists of axially aligned zones of combustion, reaction and quench; with these various zones having different longitudinal dimensions and frequently having different diameters. The fuel and oxygen-containing gas mixture is introduced in varied patterns into the combustion zone.

The characteristics of the oil furnace blacks produced in the reactor vary considerably and are dependent upon combustion conditions, stream flow pattern, composition of the hydrocarbon feedstock and other raw materials, reaction time, and operating conditions within the reactor during production.

2. Description of the Prior Art

U.S. Pat. No. 2,976,127 discloses an oil furnace carbon black reactor which is suitable foR making most commercial carcass grades of black. The present invention was developed to provide for the manufacture of relatively large-particle size, low structure carcass grades with desirably lower heat buildup, higher rebound and good rubber processibility. For example, typical SRF blacks made in 25 inch diameter (inside diameter of refractory lining) reactors of the type shown in U.S. Pat. No. 2,976,127 have iodine numbers of 26 and higher; whereas, iodine numbers as low as 20 or lower can be obtained using the process and apparatus of this invention. Iodine number is indicative of particle size; that is, a low iodine number corresponds to a large particle size.

U.S. Pat. No. 3,362,789 discloses the application of secondary heat in a carbon black process, but the reaction conditions and purpose for doing so are different. The patentees are concerned with production of blacks having high structure, which is associated with increased heat buildup. applicants, on the other hand, are concerned with the production of the lower-structure, low heat buildup carcass blacks. Also, the operating conditions are vastly different. The patentees use a much smaller amount of primary heat (approximately 2,100–2,500 BTU per pound of oil feedstock) compared with the amount (3,500–5,200) used by applicants. Furthermore, the patentees use a greater amount of secondary heat (about 5,200 BTU per pound of feedstock) than applicants use (1,000–2,500). Patentees' ratio of primary heat (per pound of feedstock) to secondary heat is about 0.4–0.5; whereas, applicants' ratio is about 1–4. More basically, however, the patentee does not disclose the introduction of secondary combustion gases downstream into an enlarged secondary reaction zone in longitudinal flow along the periphery of such secondary reaction zone.

U.S. Pat. No. 3,235,334 discloses the use of secondary heat, but the reaction conditions and purpose for doing so are also different from applicants'. The patentee is concerned with the manufacture of low-structure blacks of relatively small particle size. Applicants, on the other hand, are concerned with the manufacture of relatively large-particle size carcass blacks. In his only example (Table I), he uses a much greater amount of primary heat (about 11,000–14,000 BTU per pound of oil feedstock) compared with the amount (3,500–5,200) used by applicants. Furthermore, the patentees use a greater amount of secondary heat (about 2,800 BTU per pound of feedstock) than the amount preferred by applicants (1,000–2,500). Another difference is that the patentee uses a higher ratio (about 5) of primary heat to secondary heat than applicants use (1–4). Still further, the patentee uses tangential flow of primary combustion gases, whereas applicants use longitudinal flow. More basically, however, the patentee does not disclose the introduction of secondary combustion gases downstream into an enlarged secondary reaction zone in longitudinal flow along the periphery of such secondary reaction zone.

U.S. Pat. Nos. 2,375,795 and 2,616,794, which are less pertinent than the above-mentioned patents, disclose the use of secondary heat, but the processes are vastly different. First of all, the patentees are concerned primarily with a gas furnace process for production of small particle-size black simulating channel black. Applicants' process is an oil furnace process for production of large-particle carcass blacks. Furthermore, the patentees use tangential flow of primary combustion gases rather than longitudinal flow. More basically, however, the patentees do not disclose the introduction of secondary combustion gases downstream into an enlarged secondary reaction zone in longitudinal flow along the periphery of such secondary reaction zone.

U.S. Pat. Nos. 2,779,665; 3,003,855; and 3,490,870 all show longitudinal flow of combustion gases. U.S. Pat. No. 3,003,855 also shows flow of combustion gases around the periphery of the reaction chamber; however, these gases are the only source of heat and there is no secondary heat supplied. U.S. Pat. 3,490,870 does disclose "primary" and "secondary" sources of heat, both in longitudinal flow; however, both sources of heat are supplied at the same location and there is no downstream supply of secondary longitudinal combustion gases into an enlarged secondary reaction zone. The "tertiary heat," which is optional, is in close proximity to the primary and secondary heat supply and is introduced to provide a spiraling motion rather than longitudinal flow.

U.S. Pat. No. 2,419,565 discloses an enlarged reaction chamber downstream of an "intermediate chamber" but uses tangential flow of combustion gases in both chambers. Furthermore, the patentees use lower amounts of primary heat and a lower ratio of primary heat to secondary heat. The patentees were not concerned with the manufacture of large particle blacks.

The formation oF carbon black particles takes place in two stages, the first being the nucleation stage in which, after vaporization of the oil feedstock, there is cracking of carbon-hydrogen bonds and molecular rearrangement to form nuclei. The second stage is the growth stage in which additional materials are added to the nuclei. Both of these stages are endothermic, and the required heat is furnished partly by supplied heat and partly by combustion of the hydrogen released as a result of cracking of the carbon-hydrogen bonds.

Copending application Ser. No. 776,037, filed Nov. 15, 1968, now U.S. Pat. No. 3,607,058, discloses the use of secondary heat for the same purposes as this invention; however, the mode of application is entirely different in that the secondary combustion gases are introduced radially in that application in order to create maximum turbulence, rather than longitudinally, as in this invention, in such manner as to minimize turbulence and reduce deposition of coke on the walls of the reactor.

Copending application Ser. No. 776,038, filed Nov. 15, 1968, now abandoned, and its continuation-in-part application Ser. No. 123,453, filed Mar. 11, 1971, also disclose secondary combustion, but in those applications the secondary combustion gases are introduced tangentially rather than longitudinally.

Copending application Ser. No. 863,112, filed Oct. 2, 1969 discloses an enlarged secondary reaction zone but discloses only the tangential introduction of combustion gases.

OBJECTS OF THE INVENTION

It is an object of our invention to distribute the supplied heat required for the process in such a manner that in the nucleation stage of the process, heat and preferably excess oxygen are available to start the formation of nuclei. The highest temperature to be obtained during the entire process is to be reached shortly after the commencement of nucleation. The energy required for the carbon-hydrogen separation will rapidly exhaust the heat capacity of the system until the temperature has been reduced to the point that further nucleation is terminated but the growth phase can still be sustained. For the growth stage of the process it is required that subsequent stages of heat input take place to replenish the heat consumed, sufficiently to sustain particle growth but never so much as to reinitiate nucleation.

Another object is to introduce the secondary supply of heat avoiding any turbulence upon comingling of the secondary stream with the combustion products already formed by the primary reaction. This will limit as much as possible the tendency of the black to form the chain structures that are to be avoided for the requirements of low structure blacks.

Another object of this invention is to manufacture relatively large-particle size carcass grade carbon blacks having properties superior to those which can be produced in equivalent apparatus without the use of this invention.

Another object of this invention is to accomplish the foregoing objects without the formation of troublesome coke deposits on the walls of the reaction chamber.

SUMMARY OF THE INVENTION

This invention is a process and apparatus for the manufacture of relatively large-particle size carcass grades of carbon black involving the use of primary heat followed by secondary heat introduced into the reactor at a point downstream of the point of introduction of the primary heat in the form of hot combustion gases flowing into an enlarged secondary reaction zone in a substantially longitudinal downstream direction along the outer periphery of the secondary reaction zone.

DESCRIPTION OF THE PREFERRED EMBODIMENTS

Figure 1:
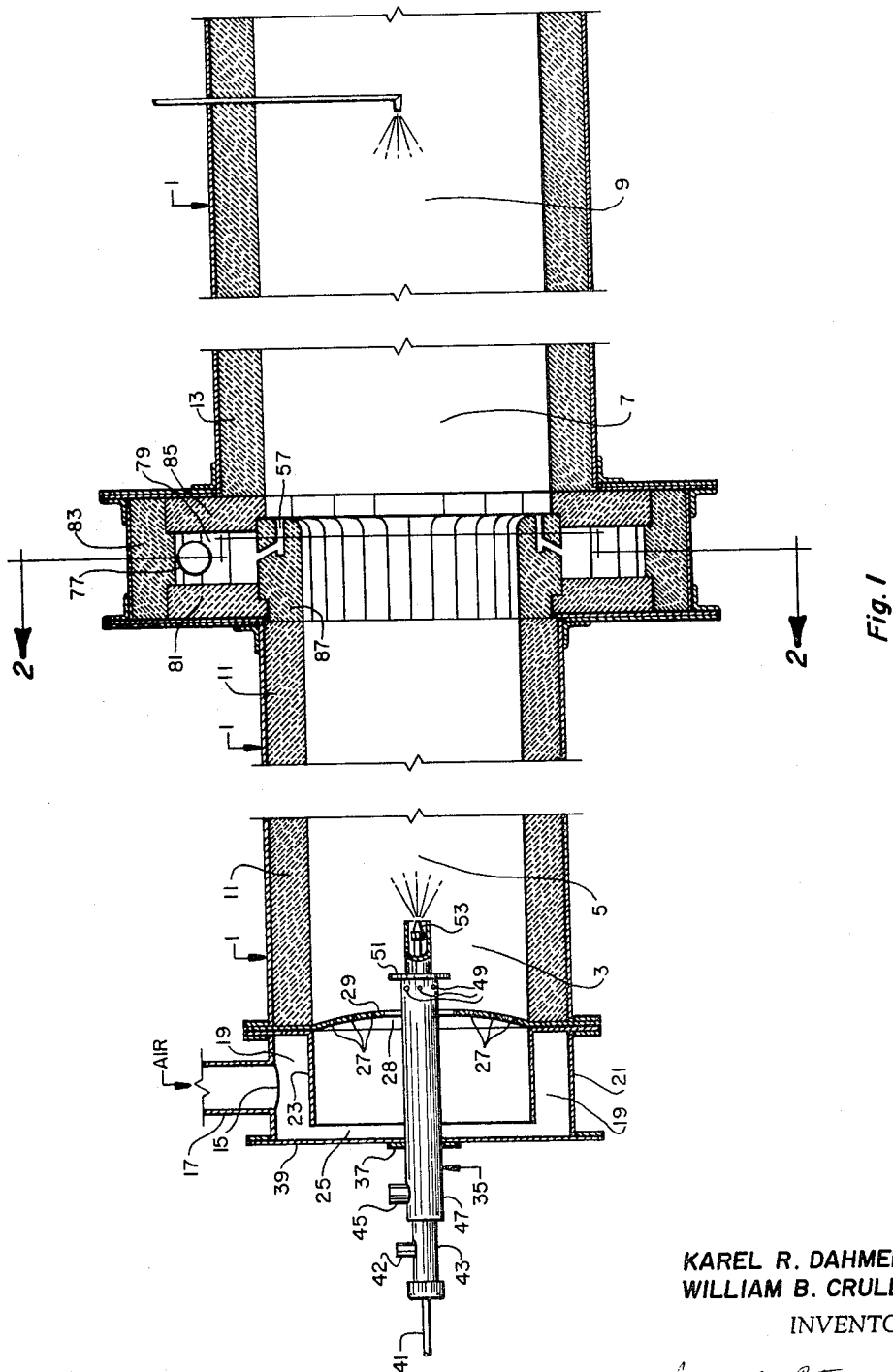
FIG. 1 is an elevational view, partly in section, illustrating a preferred embodiment of the invention.
Figure 2:
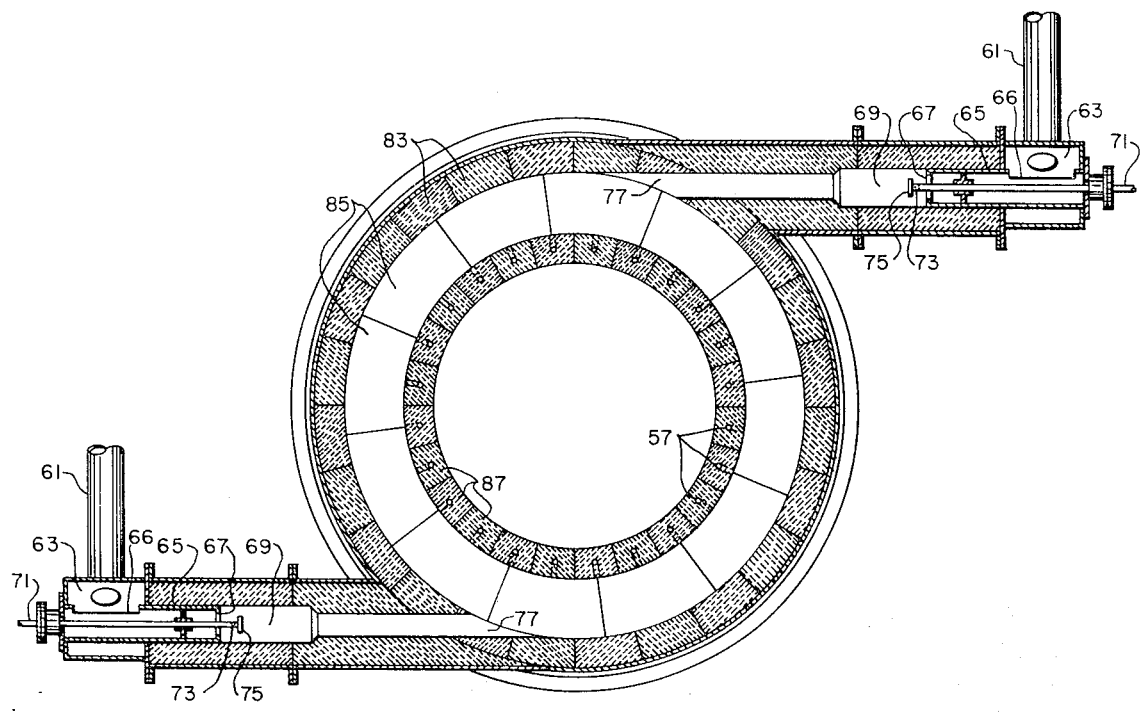
FIG. 2 is a cross-sectional view of the portion of apparatus taken along the line 2—2 of FIG. 1.

Referring first to FIGS. 1 and 2, the reactor is generally designated by the reference 1. Within the reactor there is a primary combustion zone 3 for furnishing primary heat, a primary reaction zone 5, a secondary reaction zone 7, and a quench zone 9. Refractory lining 11 has a uniform or substantially uniform diameter throughout its length, but refractory lining 13 for secondary reaction zone 7 is of enlarged diameter as will be more fully explained hereinafter.

Primary combustion air in introduced through input port 15 supplied through conduit 17, which in turn is connected to a blower and optional preheater, not shown. This primary combustion air is distributed throughout the annular zone 19 between housing 21 and a cylindrical baffle or sleeve which is coaxially affixed and aligned with said housing 21. The air then passes around the upstream end of sleeve 23 through the annular zone 25. The primary air then passes in longitudinal flow through holes 27 and orifice 28 in air distribution plate 29 into the reactor for combustion of the primary gas or other hydrocarbon fuel.

Throughout this disclosure and the appended claims, the term "air" means air, oxygen-enriched air, oxygen, or other oxygen-containing gas.

The reactor is equipped with a suitable axial feedstock injection and burner assembly 35 such as the one disclosed more fully in U.S. Pat. No. 3,443,761. Assembly 35 extends through packing gland 37, the central aperture of end plate 39, and orifice 28. Feedstock is supplied through conduit 41 enclosed by axial air pipe 43. Combustion fuel is supplied to conduit 45, through the annular zone defined by pipes 43 and 47, and into the reactor through burner ports 49 located just upstream of a suitable flameholder disc 51. Axial air is normally introduced through pipe 42. The carbon black feedstock is injected through conduit 41 and is sprayed into the primary reaction zone through nozzle 53 downstream from primary combustion zone 3. Other suitable burner and feedstock injection assemblies which could be used are disclosed in copending applications Ser. Nos. 59,961 and 59,962, both filed July 31, 1970.

Downstream of primary reaction zone 5, a secondary reaction zone 7 is established by introducing secondary hot combustion gases into the reactor through a plurality of small ports 57 at the point where the cross-sectional area of the reactor is increased to the extent that the concentration and linear downstream velocity of the combustion products are essentially unaltered. These ports 57 are located on a circle with diameter larger than the diameter of the upstream reactor cross section (inside diameter of refractory lining 11) but smaller than the diameter of the downstream cross section (inside diameter of refractory lining 13). These ports 57 are arranged so as to introduce the secondary hot combustion gases in substantially longitudinal flow; that is, substantially parallel to the main stream of carbon black and effluent gases. The result of this design is that the secondary combustion gases flow along the outer circumference of the secondary reaction zone 7.

In the design of the secondary combustion burners, it is important that they be designed so as to provide for complete combustion before the combustion gases are released into the reactor so as to insure that these gases enter the secondary reaction zone 7 at a temperature at least as high as the temperature of the reaction products entering the secondary reaction zone.

Suitable means for generating the secondary hot combustion gases and introducing such gases through ports 57 are shown in FIG. 2. Secondary combustion air supplied through conduits 61 enters air chambers 63 and flows through slots 66 into air tubes 65 by whirling motion and then through restricting orifices 67 into refractory lined combustion chambers 69. Combustion gas or other fuel enters pipes 71 and passes through holes 73 to mix with the combustion air. Flameholder discs 75 are desirably included to control the flame. The hot combustion gases from chamber 69 then pass through ports 77 into annular plenum chamber 79 defined by refractory blocks 81, 83, 85 and 87.

Although specific dimensions are not a part of this invention, the diameter of primary reaction zone 5 can be 25 inches and the diameter of secondary reaction zone 7 can be 33 inches. The secondary combustion section can be scaled up to accommodate reactors having an upstream inner diameter (diameter of primary reaction zone 5) of 33 inches and a downstream diameter (diameter of secondary reaction zone 7) of 42 inches, or even an upstream diameter of 35 inches and a downstream diameter of 45 inches.

Figure 3:
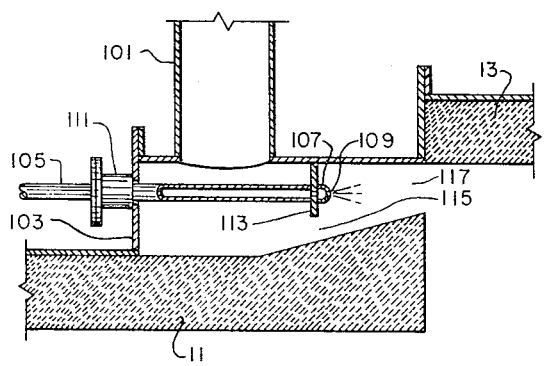
FIG. 3 is a cross-sectional view of another embodiment of a portion of the apparatus.

FIG. 3 shows an alternate means for introducing the secondary combustion gases into the secondary reaction zone. The design of FIG. 3, which is alternative to the design of FIGS. 1-2, includes secondary air conduit 101 (or preferably a plurality of such conduits) leading to air chamber 103. Combustion gas enters gas pipe 105 (or preferably a plurality of gas pipes), leading to an annular gas burner ring 107 having a plurality of gas holes 109 located throughout the circumference of said ring. Gas pipe or pipes 105 are preferably slideably mounted within packing gland 111 and are attached to slideable annular disc 113. Refractory lining 11 is preferably flared at the downstream end as shown on the drawing, in order that disc 113 can be moved longitudinally to adjust opening 115 so that enough pressure drop can be obtained to even out the annular sheet of combustion gases entering the reactor through annular space 117. The flared portion of refractory lining 11 also helps to direct the air toward the periphery of the larger diameter secondary combustion zone.

Figure 4:
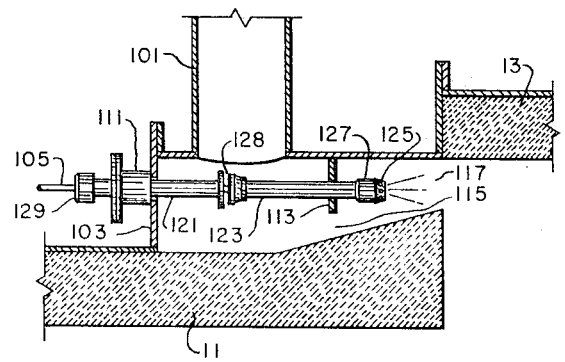
FIG. 4 is a cross-sectional view of still another embodiment of a portion of the apparatus.

In place of ring burner 107, other types of burners may be used such as a plurality of conventional air aspirating gas burners as shown in FIG. 4. Gas enters through pipe 105 and passes through burner housing 121, burner tube 123, and holes 125 in burner tip 127. Air is aspirated into burner tube 123 through a gap 128 as shown, so that a mixture of air and gas passes through holes 125. Pipe 105 is preferably slideably mounted within packing gland 129, so that the position of burner tube 123 and tip 127, which are preferably affixed to slideable disc 113, can be moved longitudinally to adjust opening 115. The position of burner housing 121 can be adjusted by movement within packing gland 111 in order to adjust the gap 128.

The design of FIGS. 1–2 is preferable to that of FIG. 3 because it provides for more complete combustion of fuel and air prior to entrance of the hot combustion gases into the reactor; hence, less likelihood of coke formation. The designs of FIGS. 3 and 4, however, have the advantage of simplicity and lower cost.

The appropriate design parameters and operating conditions are as follows:

|  | Suitable | Preferred |
| --- | --- | --- |
| Heat to primary reaction zone (BTU per pound of feedstock) | 3500–5200 | 3600–4500 |
| Primary air-to-gas ratio (to primary combustion zone) | 10:1–15:1 | 12:1–14:1 |
| Heat to secondary reaction zone (BTU per pound of feedstock) | 1000–2500 | 1200–2000 |
| Secondary air-to-gas ratio (to secondary combustion zone) | 9.6:1–20:1 | 12:1–18:1 |

The appropriate ratio of primary heat input to secondary heat input is in the range of about 1–4.

The carbon black feedstocks used are conventional carbon black oils and will not be described herein.

The combustion fuel is preferably natural gas, although other hydrocarbon fuels may also be used.

The secondary combustion ports (57 in FIGS. 1 and 2 and opening 117 of FIG. 3) are located at a distance, downstream of primary fuel ports 49, equal to about 6–14 and preferably about 7–12 times the diameter of primary reaction zone 5 (inside diameter of refractory lining 11).

While we have thus described the preferred embodiments of the present invention, many variations will be suggested to those skilled in the art. The foregoing description and examples should therefore not be considered limitative; and all such variations And modifications as are in accord with the principles described are meant to fall within the scope of the appended claims.

Having thus described our invention, we claim:

1. An apparatus for the production of oil furnace carbon black by the thermal decomposition of a hydrocarbon feedstock comprising:
    a. an elongate substantially cylindrical housing having a primary reactor section, a secondary reactor section downstream of said primary reactor section, and a reactor head section at the upstream end of said reactor, said sections being coaxially aligned in substantially horizontal communication;
    b. a first refractory lining having a substantially uniform inner diameter enclosed within said primary reaction section;
    c. a second refractory lining having a substantially uniform inner diameter enclosed within said secondary reactor section, the inside diameter of said second lining being greater than the inside diameter of said first lining;
    d. means for introducing air into said head section;
    e. means for distributing said air throughout the interior of said head section and imparting a substantially longitudinal flow to said air;
    f. a centrally apertured end plate affixed to the upstream end of said housing;
    g. a centrally apertured air distribution plate coaxially mounted between said main and head sections, said plate having a plurality of holes surrounding said aperture;
    h. a burner and feedstock injection assembly axially mounted through the central apertures of said end plate and said air distribution plate; and
    i. means for producing and introducing a secondary stream or streams of hot combustion gases into the upstream end of said secondary reactor section in a substantially longitudinally downstream direction along the periphery of the lining of said secondary reactor section.

2. The apparatus of claim 1 in which the means (i) comprises a plurality of secondary combustion ports extending through the upstream end of said secondary reactor section, said ports being located throughout the circumference of said secondary reactor section and pointed in a downstream direction along the periphery of the lining of said secondary reactor section, said means also including a secondary burner means communicating with said ports.

3. The apparatus of claim 2 in which said secondary burner means comprises at least one tunnel burner tangentially communicating with an annular plenum chamber surrounding the downstream end of said primary reactor section, said secondary combustion ports being in communication with said plenum chamber.

4. The apparatus of claim 1 in which said means (i) comprises an annular hollow burner ring circumferentially disposed about the downstream end of said primary reactor section; said ring containing a plurality of holes facing downstream into an annular combustion chamber defined by the housing and the outer surface of said first lining at its downstream end; said ring being connected to a fuel conduit or conduits; said annular combustion zone being connected to a source of air.

5. The apparatus of claim 4 in which the downstream end of said first refractory lining is flared outwardly in the downstream direction and in which there is disposed within said annular combustion chamber an annular disc which is slideable along said housing.

6. The apparatus of claim 5 in which said annular disc is connected to said burner ring and said fuel conduit, and in which said fuel conduit is slideably mounted to said housing.

7. The apparatus of claim 1 in which the means (i) comprises a plurality of air-aspirated gas burners.

8. The apparatus of claim 1 in which the means (e) comprises a cylindrical baffle or sleeve coaxially mounted within said head section having a diameter substantially equal to the inside diameter of the said refractory lining and extending from the downstream end of said head section to the vicinity of, but spaced from, said end plate, thereby establishing an annular zone between said second housing section and said baffle.

9. The apparatus of claim 2 in which the means (e) comprises a cylindrical baffle or sleeve coaxially mounted within said head section having a diameter substantially equal to the inside diameter of the said refractory lining and extending from the downstream end of said head section to the vicinity of, but spaced from, said end plate, thereby establishing an annular zone between said second housing section and said baffle.

10. The apparatus of claim 3 in which the means (e) comprises a cylindrical baffle or sleeve coaxially mounted within said head section having a diameter substantially equal to the inside diameter of the said refractory lining and extending from the downstream end of said head section to the vicinity of, but spaced from, said end plate, thereby establishing an annular zone between said second housing section and said baffle.

11. The apparatus of claim 4 in which the means (e) comprises a cylindrical baffle or sleeve coaxially mounted within said head section having a diameter substantially equal to the inside diameter of the said refractory lining and extending from the downstream end of said head section to the vicinity of, but spaced from, said end plate, thereby establishing an annular zone between said second housing section and said baffle.

12. The apparatus of claim 5 in which the means (e) comprises a cylindrical baffle or sleeve coaxially mounted within said head section having a diameter substantially equal to the inside diameter of the said refractory lining and extending from the downstream end of said head section to the vicinity of, but spaced from, said end plate, thereby establishing an annular zone between said second housing section and said baffle.

13. The apparatus of claim 6 in which the means (e) comprises a cylindrical baffle or sleeve coaxially mounted within said head section having a diameter substantially equal to the inside diameter of the said refractory lining and extending from the downstream end of said head section to the vicinity of, but spaced from, said end plate, thereby establishing an annular zone between said second housing section and said baffle.

14. The apparatus of claim 7 in which the means (e) comprises a cylindrical baffle or sleeve coaxially mounted within said head section having a diameter substantially equal to the inside diameter of the said refractory lining and extending from the downstream end of said head section to the vicinity of, but spaced from, said end plate, thereby establishing an annular zone between said second housing section and said baffle.

15. The apparatus of claim 3 in which there are at least two of said tunnel burners spaced about said secondary reactor section.

16. The apparatus of claim 10 in which there are at least two of said tunnel burners spaced about said secondary reactor section.

17. In a process for the production of carcass grades of oil furnace carbon black in which a carbon black feedstock is introduced axially into one end of an elongate, substantially cylindrical, refractory lined reactor into a primary reaction zone heated by primary hot combustion gases from the burning of a hydrocarbon gas or other fuel with air, said combustion gases flowing in longitudinal downstream flow, the improvement which comprises introducing a secondary stream of hot combustion gases into the upstream end of an enlarged secondary reaction zone, said secondary stream having a temperature at least as high as the reaction products entering the secondary reaction zone from the primary reaction zone and being introduced in downstream substantially longitudinal flow along the outer periphery of said secondary reaction zone.

18. The process of claim 17 in which said primary combustion gases and said secondary combustion gases are introduced at a rate sufficient to supply heat in the amount of about 3,500–5,200 BTU and 1,000–2,500 BTU per pound of feedstock, respectively; in which the ratio of said primary heat to said secondary heat is about 1–4; and in which the point of introduction of said secondary combustion gases is located at a distance downstream of the point of introduction of said primary combustion gases equal to about 6–14 times the inside diameter of the primary reaction zone.

19. The process of claim 18 in which:
a. said primary heat is supplied in an amount of about 3,600–4,500 BTU per pound of said feedstock;
b. said secondary heat is supplied at a distance downstream of the point of introduction of said primary heat equal to about 7–12 times the inside diameter of said refractory lining in an amount of about 1,200–2,000 BTU per pound of said feedstock.

20. The process of claim 19 in which the air-to-gas ratio for said primary combustion is from about 12:1 to about 14:1 and the air-to-gas ratio for said secondary combustion is from about 12:1 to about 18:1.

21. The process of claim 17 in which said secondary stream of hot combustion gases is introduced into said enlarged secondary reaction zone such that the concentration and linear downstream velocity of the combustion products are essentially unaltered.

22. The process of claim 18 in which said secondary stream of hot combustion gases is introduced into said enlarged secondary reaction zone such that the concentration and linear downstream velocity of the combustion products are essentially unaltered.

23. The process of claim 19 in which said secondary stream of hot combustion gases is introduced into said enlarged secondary reaction zone such that the concentration and linear downstream velocity of the combustion products are essentially unaltered.

24. The process of claim 20 in which said secondary stream of hot combustion gases is introduced into said enlarged secondary reaction zone such that the concentration and linear downstream velocity of the combustion products are essentially unaltered.

* * * * *